US012403568B2

(12) United States Patent
Speer

(10) Patent No.: US 12,403,568 B2
(45) Date of Patent: Sep. 2, 2025

(54) WORK PIECE HOLDER ASSEMBLY AND METHOD

(71) Applicant: Ronald Eugene Speer, Easley, SC (US)

(72) Inventor: Ronald Eugene Speer, Easley, SC (US)

( * ) Notice: Subject to any disclaimer, the term of this patent is extended or adjusted under 35 U.S.C. 154(b) by 0 days.

(21) Appl. No.: 18/426,465

(22) Filed: Jan. 30, 2024

(65) Prior Publication Data

US 2025/0242476 A1 Jul. 31, 2025

(51) Int. Cl.
*B25B 11/00* (2006.01)

(52) U.S. Cl.
CPC .................................. *B25B 11/002* (2013.01)

(58) Field of Classification Search
CPC .............................. B25B 11/00; B25B 11/002
See application file for complete search history.

(56) References Cited

U.S. PATENT DOCUMENTS 2,421,716 A 6/1947 Rose
2,666,352 A * 1/1954 Philips .................. B25B 1/2452 279/151
3,643,935 A * 2/1972 Bell .................... E04F 21/0023 269/84
4,303,054 A 12/1981 Lore
4,777,463 A 10/1988 Cory et al.
4,837,540 A 6/1989 Cardone et al.
6,644,637 B1 11/2003 Hung et al.
7,950,635 B2 * 5/2011 Proehl ................. B05B 13/0285 248/676
7,971,863 B2 7/2011 Hung et al.
8,905,387 B2 12/2014 Wang
9,737,967 B2 * 8/2017 Reckevícius ........ B23Q 3/1546
9,956,811 B2 * 5/2018 Mann ........................ B43L 1/00
10,588,464 B2 * 3/2020 Assassa ................ A47J 47/005
12,179,293 B2 * 12/2024 Hanschmann ......... B23K 26/26
2006/0157904 A1 7/2006 Yu-Chi et al.
2009/0051090 A1 * 2/2009 Barnes, Jr. .............. B25B 11/02 269/8
2011/0018182 A1 * 1/2011 Day ..................... B23Q 3/1543 29/559
2014/0008853 A1 1/2014 Innocenter et al.
2019/0022808 A1 * 1/2019 Tsui ....................... B23Q 1/621

FOREIGN PATENT DOCUMENTS

CN 207236971 U * 4/2018
GB 2435961 9/2007
WO WO2021009069 1/2021

* cited by examiner

*Primary Examiner* — Lee D Wilson
(74) *Attorney, Agent, or Firm* — Southeast IP Group LLC; Thomas L. Moses

(57) ABSTRACT

A work piece holder assembly includes a main body member having a bottom member, sides and a pivoting work surface on a top portion thereof, wherein the work surface may be positioned in a closed position, or may be disposed in an open position at a desired angle. The work surface is preferably magnetic, and magnetic base holders may be placed onto the work surface in any desired configuration to hold a work piece in place. Extender elements may be removably attached to the base holders for additional support of the work piece. The base holders and extenders may be stored within the main body member when not in use.

54 Claims, 11 Drawing Sheets

WORK PIECE HOLDER ASSEMBLY AND METHOD

FIELD OF THE INVENTION

The present invention generally relates to modular work piece holders. More specifically, the present invention relates to work stations having a flat surface for removably attaching a variety of different holding elements that are configured to hold a work piece in place while work is being performed on the work piece.

BACKGROUND OF THE INVENTION

There are many types of work piece holders in use today for securely holding an odd, irregular or complex shaped object so that a user can perform physical or artistic work on it, and so that a user's hands remain free to use small hand or power tools on the object. The following references disclose devices and systems have been developed for such purposes, and each of the references referred to hereinbelow are hereby incorporated herein by reference, in their entireties:

G.B. Patent No. 2435961 Work Piece Holding System or Method

A work piece holding system, or method, comprises a work piece holder which is held down magnetically. A hold down device 10 may form the top surface of a magnetic chuck where permanent magnets are actuated by a handle 11. Different work piece holders may be held against lateral movement on a base plate of the hold down device 10 by mechanical abutment means which may take the form of one or more lug or pin 15 and corresponding recess arrangement which engage to prevent lateral movement. The hold down device 10 may include vacuum holding means 12, 13, 16 associated with a base plate where the vacuum is generated by a venturi device. Work piece holders may be moved, in turn, to and from a machining station where the work piece holders are held against a base plate of the hold down device 10 within the machining station, magnetically.

U.S. Pat. No. 4,303,054 Detachable Magnetic Base for Machine Tool Table

A detachable magnetic base for a machine tool table is described having a permanent magnet for contact with the table, a body member thereabove for securing auxiliary devices thereto, and a manually adjustable bolt passing through the body member and magnet to engage the table and release the magnet for removal or to disengage from the table and permit the magnetic base to become affixed to the table. Other uses are described.

U.S. Pat. No. 4,837,540 Magnetic Work-Holder

A magnetic holding device, comprising magnetically activable holding surface having pole members of different polarities, and at least a first and a second single-pole extension members for said pole members of opposite polarities. Each pole-extension member comprises a base portion fastened to a pole member and a movable portion sliding on said base portion along an inclined surface the sliding surfaces of said first and second pole-extension members are slanted in opposite angular directions in respect to said holding surface of the device.

U.S. Pat. No. 6,644,637 Reconfigurable Workholding Fixture

A reconfigurable fixture for workpieces is disclosed. It utilizes a flat surface magnetic chuck with modular workpiece supporting, locating and clamping elements that are carefully located on it and held by magnetic attraction to it. These elements are precisely located to hold the workpiece in spaced relation to the chuck surface. Some locating elements are mechanically fixed to the chuck for securing the workpiece from transverse movement on the chuck surface. Preferably, each of the supporting, locating and clamping members are fixed to separate steel bases for magnetic attraction to the chuck. Each base may also carry its own hydraulic actuator for height adjustment of a support element or for height adjustment and closure of a clamping element. These modular elements can be selected from a storage magazine and located on a chuck by numerically controlled mechanisms.

U.S. Pat. No. 7,971,863 Clamping Apparatus with Position Validation Function and Clamping Process Using Same An exemplary clamping apparatus includes a supporting body, a plurality of clamping units installed on the supporting body, a PWM controller, and a detection unit. Each clamping unit includes a magnet, a clamping pin, an electrical coil, and a coil core mechanically engaged with the clamping pin. The magnet is configured for holding the clamping pin at a target position. The PWM controller is configured for supplying a pulse signal to the respective electrical coil of each clamping unit and for thereby creating a magnetic force causing a corresponding coil core and a corresponding clamping pin to, synchronously, move. The detection unit is configured for detecting a back electromotive force representative of the arrival to the target position of a clamping pin and signaling the PWM controller to stop supplying the pulse signal. A clamping process utilizing the clamping apparatus is also provided.

U.S. Pat. No. 8,905,387 Magnetic Worktable

A magnetic worktable includes a worktable body and a plurality of magnetic devices disposed at a worktable body. Positions of the magnetic devices at the worktable body are variable. The magnetic devices are electrically connected to each other via a circuit, such that the magnetic devices can generate a magnetic attraction force when magnetized. The total area of the magnetic devices accounts for a small portion of the worktable body area, allowing a user to change the arrangement and quantity of the magnetic devices by modularization and according to the shape and processing method of a workpiece. Therefore, any workpieces can be fixed to the magnetic devices by magnetic attraction. Accordingly, the magnetic worktable incurs a low manufacturing cost and advantageously features high practicability.

U.S. Pat. No. 9,737,967 Universal Magnetic Table Jig Assemblies and Methods for Positioning a Workpiece, Especially for the Fabrication of Aircraft Structural Components Magnetic table jig assemblies and methods allow workpieces (e.g., aircraft components to be fabricated) on a table top of the table jig assembly to be accurately indexed relative to a robotically operated tool (e.g., a robotically operated drill). The magnetic table jig assembly may include a wheeled frame which is capable of rolling movement across a floor surface, a horizontally planar table top exhibiting ferromagnetic properties supported by the frame and a plurality of magnetic workpiece positioners each including an actuator to magnetically couple and decouple the magnetic workpiece positioner to the table top. The workpiece will therefore be positioning restrained on the table top by magnetically coupling the plurality of the magnetic workpiece positioners to the table top in abutting relationship to a perimetrical edge of the workpiece.

U.S. Patent Publication No. 20060157904 Apparatus for Fixing a Workpiece and Fixing Unit Thereof An apparatus for fixing a workpiece by a magnetic force includes a carrier and a fixing unit. The carrier is made of a magnetic material. The fixing unit is disposed on the workpiece, fixing the workpiece on the carrier. The fixing unit includes a supporting portion, a magnet and a connecting portion. The magnet is disposed in the supporting portion. The connecting portion is connected to the supporting portion and is used for being joined to the workpiece. The fixing unit is fixed on the carrier by a magnetic force, for fixing the workpiece on the carrier.

U.S. Patent Publication No. 20140008853 Magnetic Device for Gripping and Clamping a Workpiece in a Machining Unit or Machining Line A magnetic device for gripping and clamping a workpiece in a machining unit or on a machining line including a magnetic plate having a distribution of high-energy permanent-magnet modules, which can be electrically activated. An auxiliary workpiece-holder plate made of ferromagnetic material rests on a main surface of the magnetic plate and has a top surface shaped in a way complementary to a surface of the workpiece that rests thereon. The workpiece rests on the top surface of the auxiliary workpiece-holder plate only in points corresponding to some supporting pads, whilst the facing surfaces of the workpiece and auxiliary workpiece-holder plate are kept slightly set apart from one another for most of their extension.

WIPO Patent Publication No. 20140008853 Magnetic Device for Gripping and Clamping a Workpiece in a Machining Unit or Machining Line The invention relates to a workpiece carrier system (10) having a base part (12) and at least one fixing element (14) for fixing a workpiece (22) to the base part (12), wherein the fixing element (14) has a fixing portion (16) by which the fixing element (14) is magnetically fixable to the base part (12). It is characterized in that the fixing element (14) has a clamping portion (20) different from the fixing portion (16) and a positioning portion (21) different from the fixing portion (16), wherein the clamping portion (20) and/or the positioning portion (21) are set up to secure the workpiece (22) to the base part (12) at least in one plane, in particular to clamp it firmly to the base part (12). The invention also relates to a fixing element (14) for such a workpiece carrier system (10). The workpiece carrier system (10) according to the invention and the fixing element (14) according to the invention allow secure fixing of workpieces (22) and are usable in a versatile manner.

SUMMARY OF THE INVENTION

In one embodiment, a modular work piece system includes a main body member having a flat upper surface (also referred herein to a 'work surface') that is preferably made or formed from a material having magnetic properties. The main body member may be in the shape of a box, and the work surface may be pivotally attached to the main body member via a hinge or the like, so that it opens like a lid. The work surface may include a mechanism for holding the work surface open at a desired angle, and a lip along the bottom edge when the work surface is disposed in an angular plane, so that the work surface forms a type of magnetic easel. A handle member may be affixed to a side of the main body member for carrying and transport.

The modular work piece system also includes a variety of different holding elements, including components that are generally divided between base holders and extenders. The base holders include magnets attached to a bottom portion thereof for removably and magnetically attaching the base holders to the work surface, and in some embodiments, the base holders may further include attachment elements, such as a socket, for receiving extenders having a complementary attachment element. In a preferred embodiment, the holding elements may include padding, such as rubber or foam pads, which provides adjustable grip and holding pressure against the work piece being held, and also helps to prevent damage to the work piece. The holding elements may further include hooks or posts extending outwardly therefrom, for holding rubber bands or small straps in place across the work piece, thus providing additional protection against the work piece becoming dislodged from the work surface, particularly when the work surface is disposed in an angular configuration.

The base holders may be arranged in any desired configuration on the magnetic work surface, and the extenders may be attached to the base holders, as necessary, for configuring unique, customized arrangements for holding work pieces in place.

BRIEF DESCRIPTION OF THE DRAWINGS

The drawings and specific descriptions of the drawings, as well as any specific or alternative embodiments discussed, are intended to be read in conjunction with the entirety of this disclosure. The work piece holder assembly may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION OF THE INVENTION

The present invention is directed to a work piece holder assembly, and some embodiments of the present invention are shown in FIGS. 1-19. In a preferred embodiment, the modular work piece holder assembly includes a main body member 10 having a work surface 12 that is preferably made or formed from a material having magnetic properties, as well as holding elements 26, 28 that may be magnetically placed about the magnetic work surface for holding a work piece 14 in place while work is performed thereon.

Main Body Member

Figure 2:
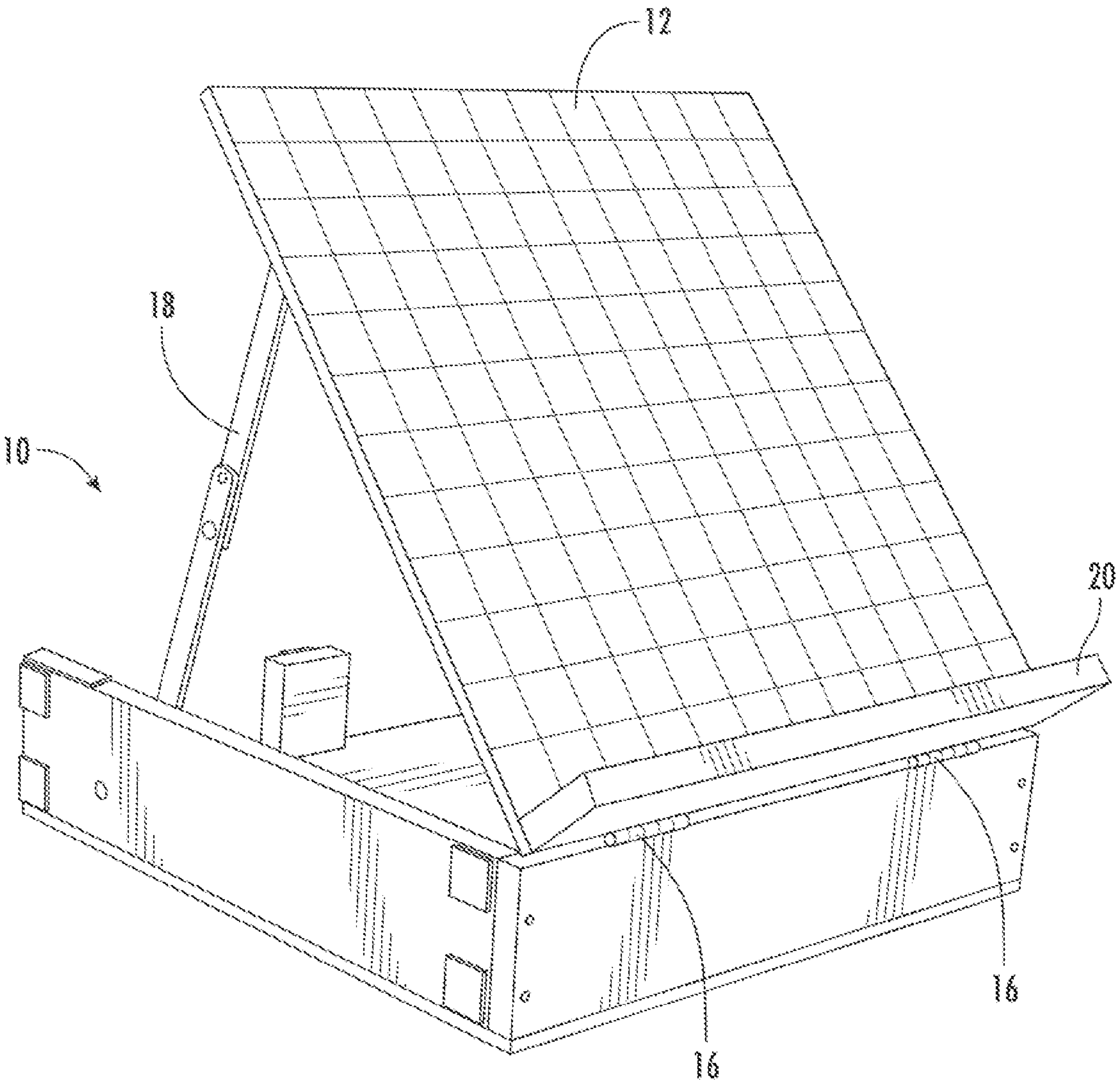
FIG. 2 is a front perspective view of the embodiment shown in FIG. 1A, wherein the work surface is disposed in an open position, and further illustrating an elbow joint that serves to maintain the work surface in an open position.
Figure 3:
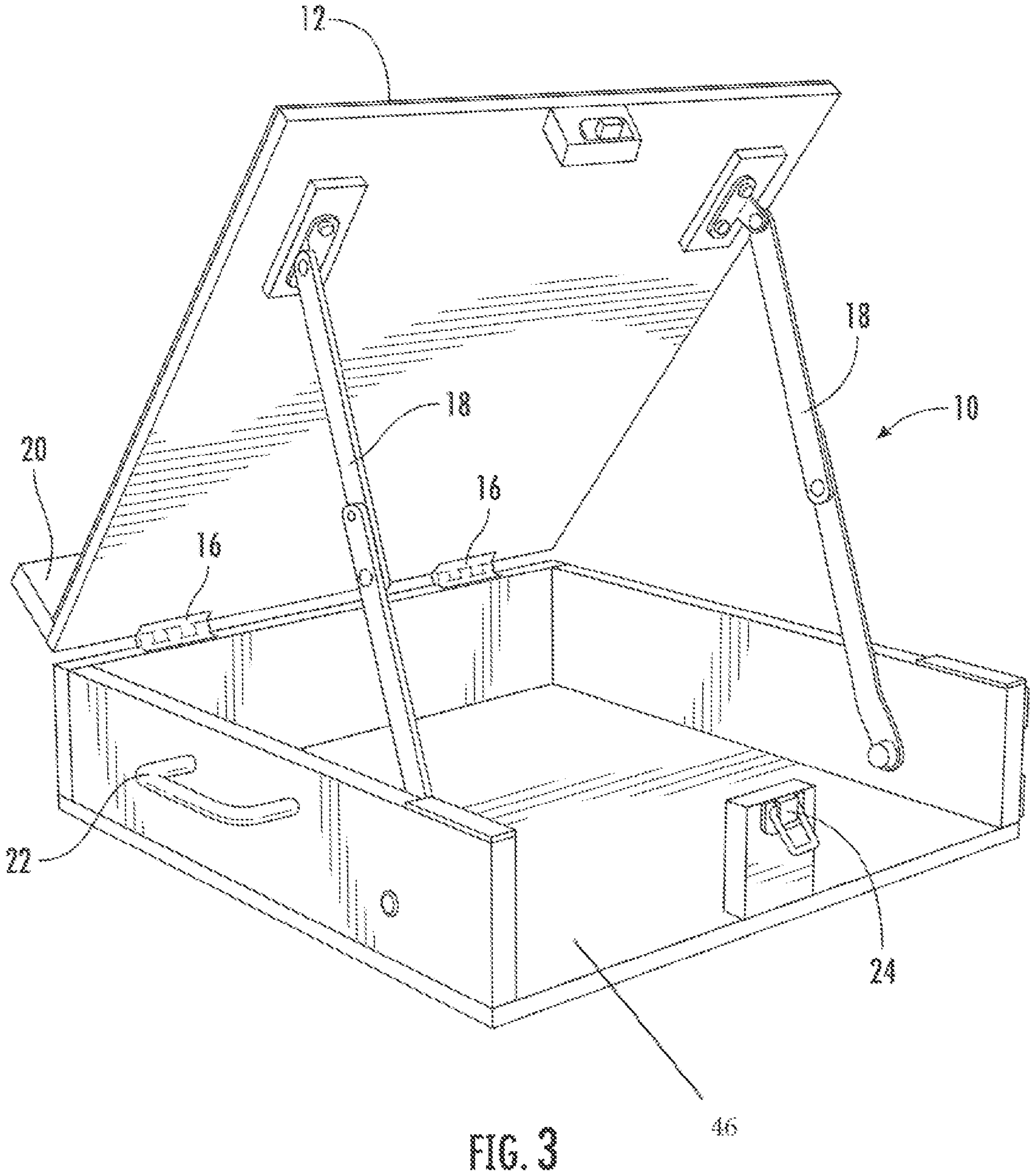
FIG. 3 is a rear perspective view of the embodiment shown in FIG. 1A, wherein the work surface is disposed in an open position, and further illustrating a pair of elbow joints extending between two opposed sides of the main body member and an underside of the work surface, wherein the elbow joints serve to maintain the work surface in an open position.
Figure 4:
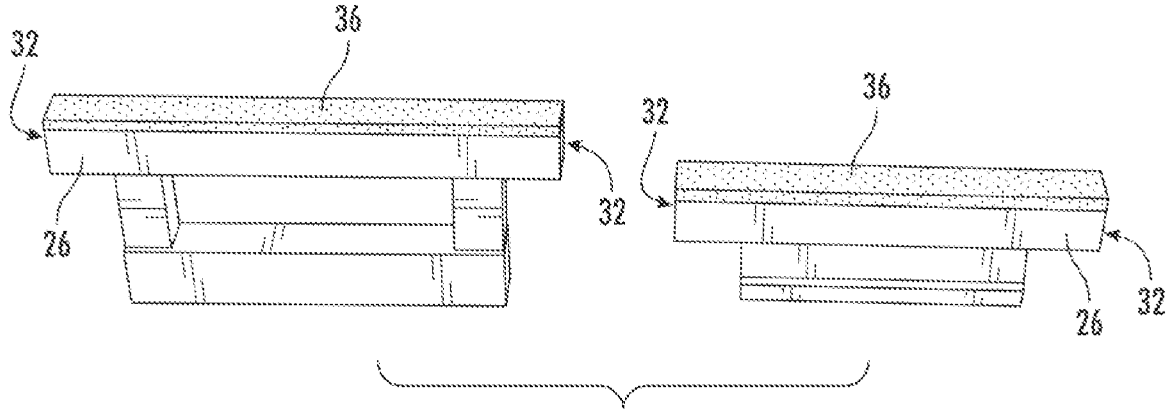
FIG. 4 is an elevated perspective view of two embodiments of base holders that include magnets in a bottom portion thereof, and further include a horizontal top surface including pad members attached thereto, as well as socket members on either end for receiving extender elements.

The main body member 10 may be generally in the shape of a box having four sides, a bottom member 46, wherein the work surface 12 may be pivotally attached to the main body member 10 via a hinge 16 or the like, so that it opens like a lid, as shown in FIGS. 2 and 3. The work surface 12 may include a mechanism for holding the work surface 12 in an open position at a desired angle, such as a hinged elbow joint 18, as shown, and a lip 20 along the hinged edge of the work surface 12, so that the work surface 12 forms a type of magnetic easel as shown in FIGS. 2-3 and 17-19. A handle member 22 may be affixed to a side of the main body member 10 for carrying and transport. Additionally, grid lines may be shown on the work surface 12 to aid a user in proper alignment of the work piece 14, as well as the holding elements.

It is contemplated that the holder elements 26, 28 may be placed and stored within the main body member 10 when not in use, and the work surface 12 may include a securing mechanism, such as a latch 24, clasp, or the like, to maintain the work surface 12 in a closed position, in order to secure the holder elements 26, 28 within the main body member 10 during transport and storage. In a preferred embodiment, the bottom member 46 of the main body member may also include a magnetically active surface, so that the magnetized holder elements (base holders 26) may be removably attached thereto, to prevent the base holders 26 from unrestricted, potentially damaging movement within the main body member 10 when the main body member 10 is being carried, moved or transported. Additionally, a box having a magnet on a bottom surface thereof may be placed onto the magnetic bottom member 46 of the main body member 10, and the box may be used to store the extenders 28 and other non-magnetic components when not in use.

Holder Elements

The modular work piece system also includes a variety of different holding elements, including components that are generally divided between base holders 26 and extender elements 28, as shown in FIGS. 4-14.

Figure 14:
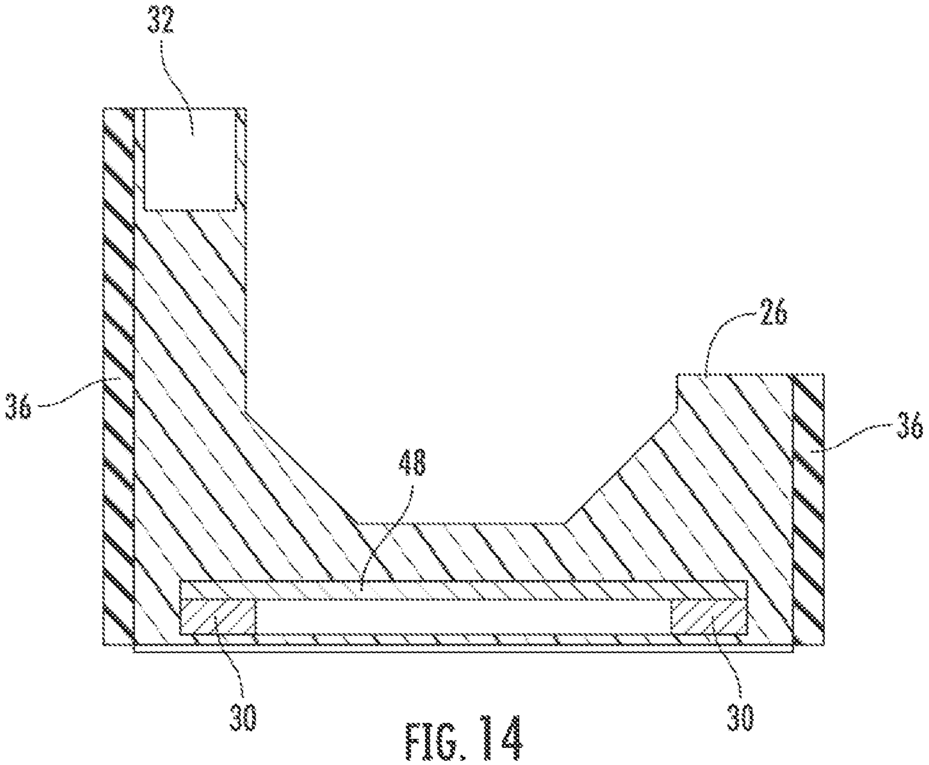
FIG. 14 is a cross-sectional view of one embodiment of a base holder, wherein the base holder includes magnets disposed in a bottom portion thereof with a bar having magnetic properties (such as a steel bar) attached or adhered to the upper portion of the magnets, the base holder additionally including two vertical posts of different heights with padding attached to outer facing surfaces of the vertical posts, and further includes a socket member at the top of the vertical post of greater height.

The base holders 26 include magnets 30 attached to the underside of a generally horizontally oriented magnetically active bar 48, such as a carbon steel bar, so that the magnets 30 are positioned adjacent to a bottom portion thereof for removably and magnetically attaching the base holders 26 to the work surface 12. In this embodiment, one magnet 30 is preferably oriented so that the south pole is facing upwardly, and the north pole is facing downwardly, while the second magnet 30 is oriented in the opposed direction, with the south pole facing downwardly and the north pole facing upwardly, as shown in FIG. 14. This arrangement creates a stronger magnetic field, which increases the attraction between the base holder 26 and the magnetic work surface 12. It should be understood that any suitable magnets 30 may be used for these purposes, but in a preferred embodiment, rare earth magnets 30 are used within the base holders 26.

Figure 6:
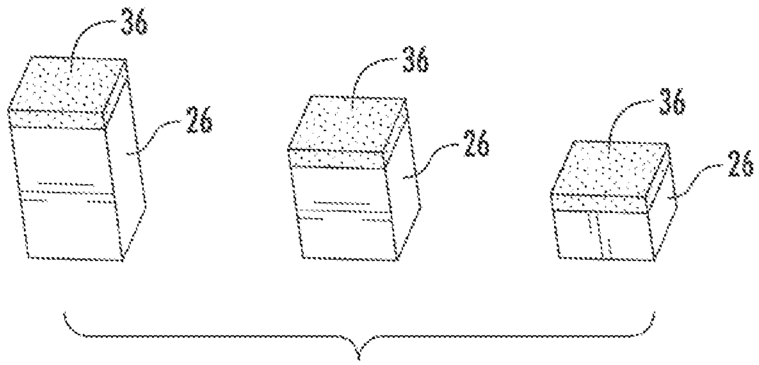
FIG. 6 is an elevated perspective view of three embodiments of base holders that are columns of different heights, each including a magnet in the bottom portion thereof, and wherein padding is attached to the top surface thereof.

In some embodiments, particularly those shown in FIG. 6, the base holders 26 may include only one magnet. It should be understood that the base holders may include a single magnet, or multiple magnets, as desired.

In some embodiments, the base holders 26 may further include attachment elements, such as a socket 32, for receiving extender elements having a complementary attachment element such as male protrusions 34. In a preferred embodiment, the holding elements 26, 28 may include padding 36, such as rubber, foam pads, gripping pads, or any other suitable material that provides suitable compression and grip, as the padding 36 is intended to provide adjustable holding pressure against the work piece 14 being held, and also helps to prevent damage to the work piece 14.

Figure 13:
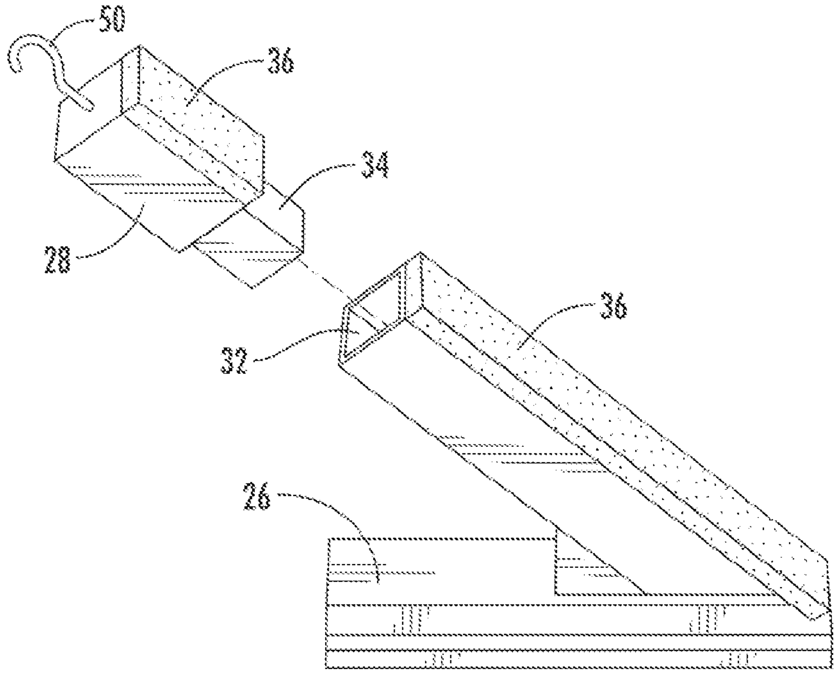
FIG. 13 is an elevated perspective exploded view of a base holder and an extender element, illustrating that the male protrusion of the extender element may be removably inserted into the socket of the base holder, and further showing a hook extending outwardly from a top surface of the extender element for securing rubber bands or the like thereto.

The holding elements 26, 28 may further include hooks 50 or posts extending outwardly therefrom, as shown in FIG. 13, for holding rubber bands or small straps in place across the work piece 14, thus providing additional protection against the work piece 14 becoming dislodged from the work surface 12, particularly when the work surface 12 is disposed in an angular configuration. In another embodiment, strips of hook and loop fastening material (Velcro®) may be attached to surfaces of the base holders 26 and/or extenders 28, similar to the manner in which padding is attached thereto, so that complementary hook and loop straps may be removably attached thereto. In this way, if base holders with hook and loop materials adhered to a surface thereof are positioned on opposed sides of a work piece, a complementary strip (or strap) of hook and loop fastening material may be attached to one such base holder and extend across the workpiece for attachment to a second such base holder.

Figure 5:
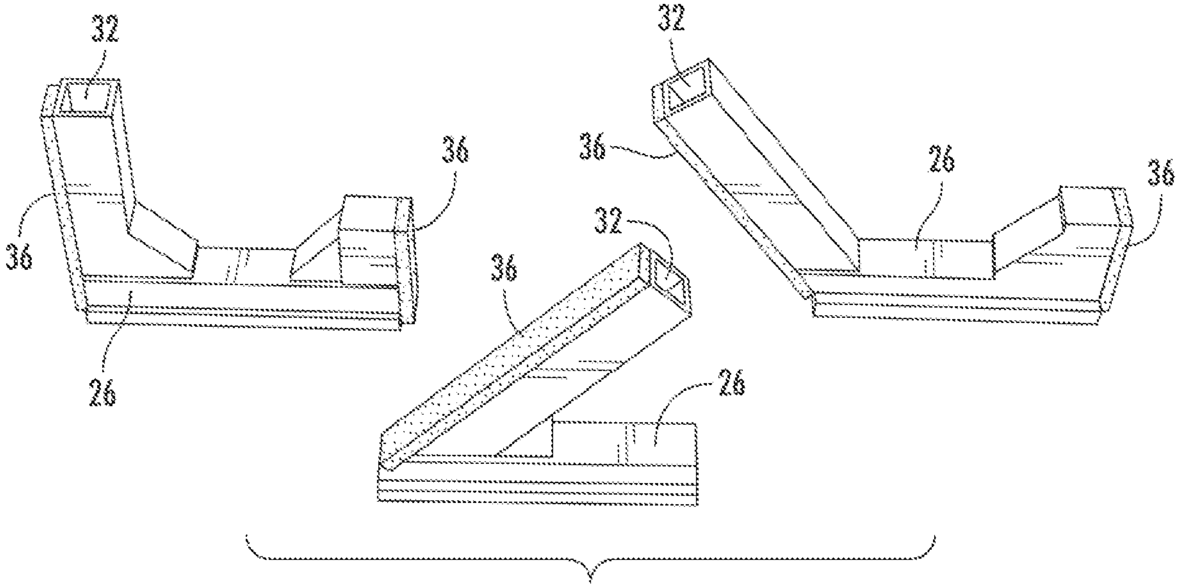
FIG. 5 is an elevated perspective view of three embodiments of base holders that include magnets in a bottom portion thereof, and further including vertical posts having sides having pad elements, and two embodiments having angled posts that include padding on one side thereof, wherein the angles of the posts form either an acute angle or an obtuse angle with respect to the main body member when the base holders are magnetically and removably affixed to a work surface, and wherein the vertical post and angled posts each include a socket member for receiving an extender element.
Figure 17:
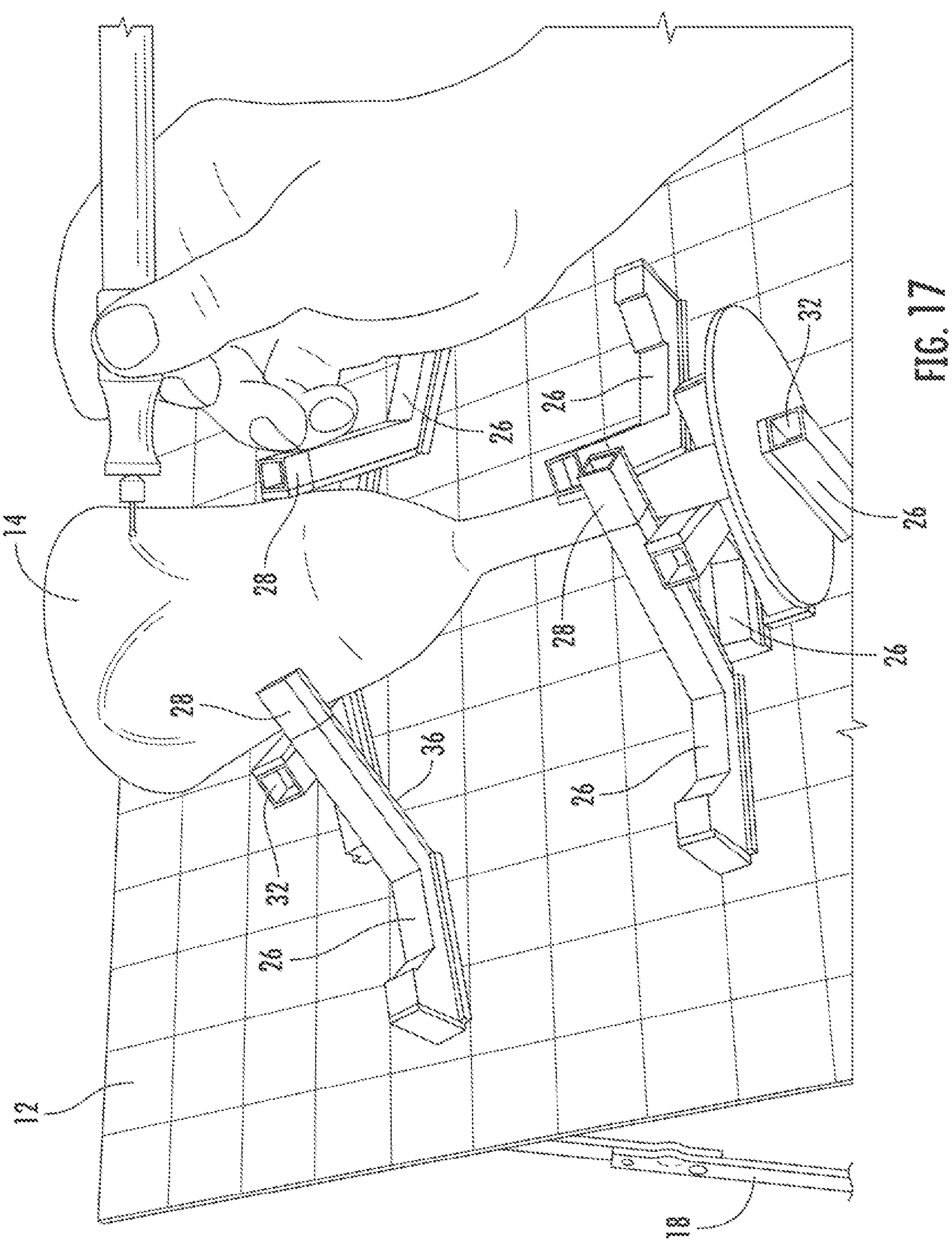
FIG. 17 is an elevated perspective view of an example of one embodiment of work piece holder assembly in use holding a work piece, illustrating a work surface in a raised position, and further showing various base holders and extenders magnetically attached thereto, and arranged in a configuration to temporarily hold a goblet in place while a user performs work thereon.
Figure 18:
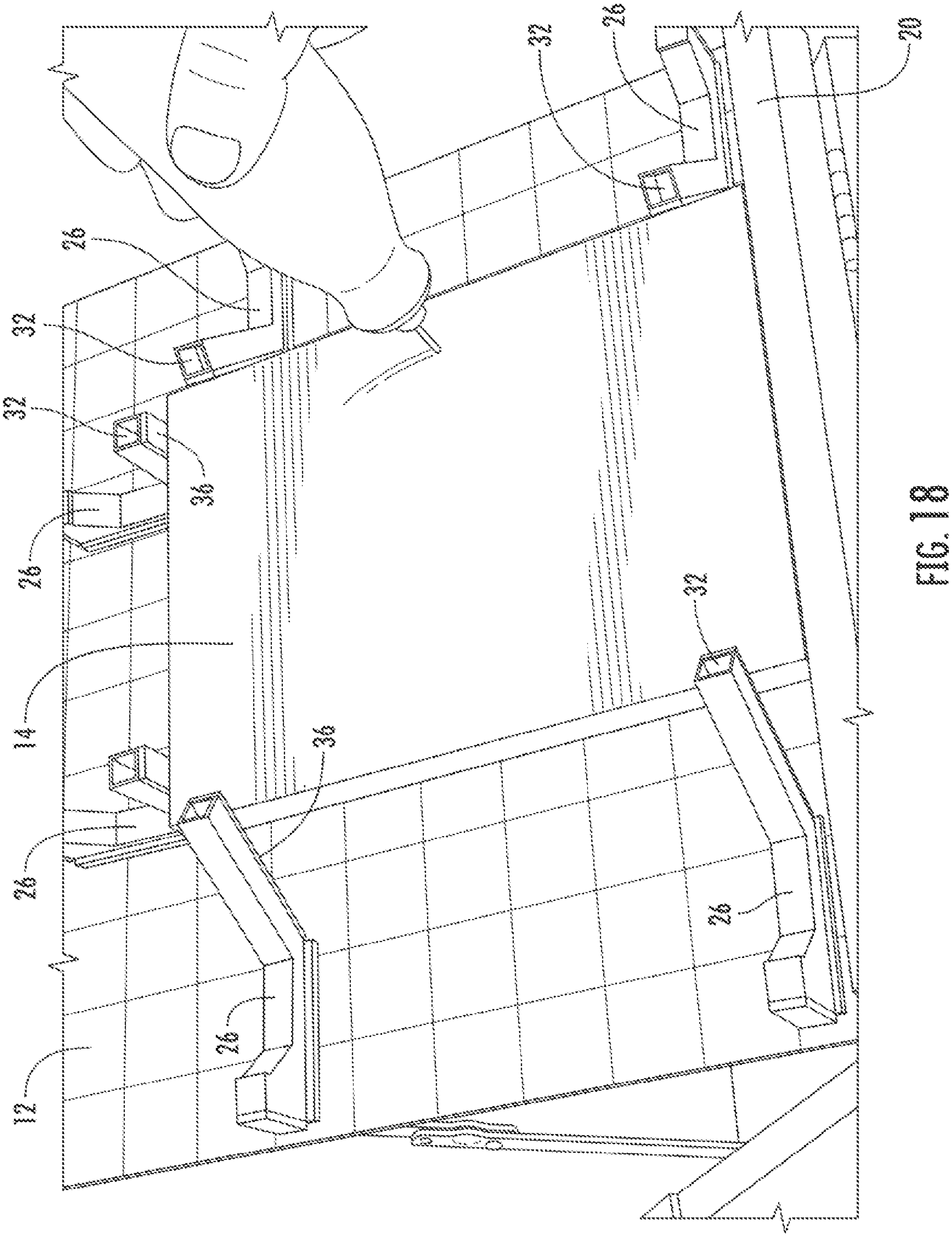
FIG. 18 is an elevated perspective view of an example of one embodiment of work piece holder assembly in use holding a work piece, illustrating a work surface in a raised position, and further showing various base holders and extenders magnetically attached thereto, and arranged in a configuration to temporarily hold a flat work piece in place while a user performs work thereon.
Figure 19:
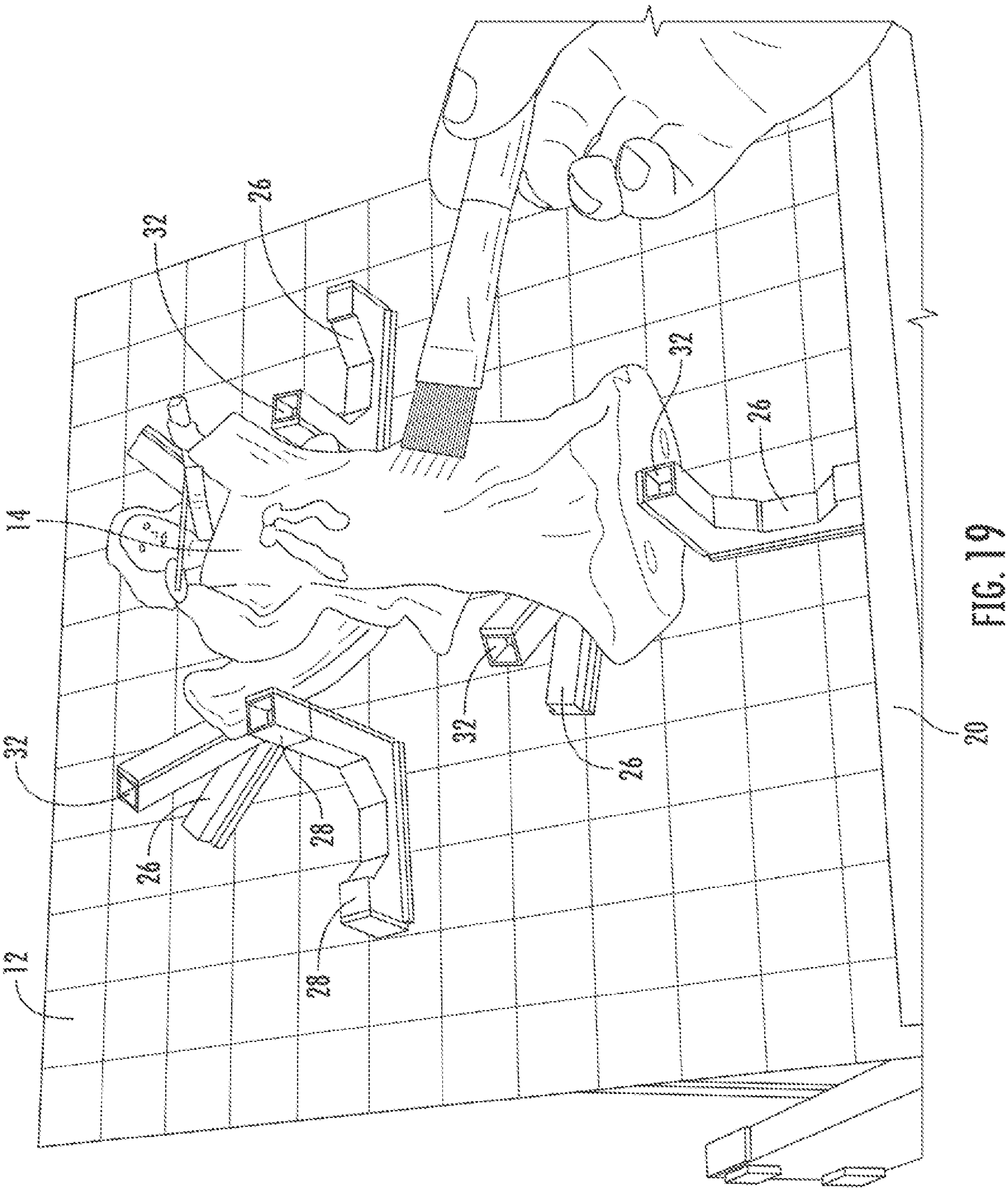
FIG. 19 is an elevated perspective view of an example of one embodiment of work piece holder assembly in use holding a work piece, illustrating a work surface in a raised position, and further showing various base holders and extenders magnetically attached thereto, and arranged in a configuration to temporarily hold an irregularly shaped figurine in place while a user performs work thereon.

The base holders 26 may be formed into any desired shape, and examples of useful base holder shapes are shown in FIGS. 4-6 and 13-14. Base holders 26 may be formed into a generally U shape, having vertically oriented sides, wherein a first side is longer than a second side, as shown in FIGS. 5 and 14. Padding 36 is preferably positioned along the outer surfaces of each side, and this configuration allows a user to use either the long side or the short side by orienting the desired side toward the work piece 14, as shown in FIGS. 17-19. Other base holders 26 may include sides oriented at an angle, such as those shown in FIGS. 5 and 13. The padding 36 may be affixed to any outer side of any of the holder element 26, 28 embodiments, as desired.

In some embodiments, the base holders 26 include an attachment mechanism for receiving extenders (also referred to herein as 'extender elements') that may be removably attached thereto. For example, the base holder may include a generally square shaped socket 32, as shown in FIGS. 5 and 7, and the extenders 28 may include a complementary square shaped male protrusion 34 that fits into the socket 32 of the base holder, as shown in FIG. 13.

Figure 12:
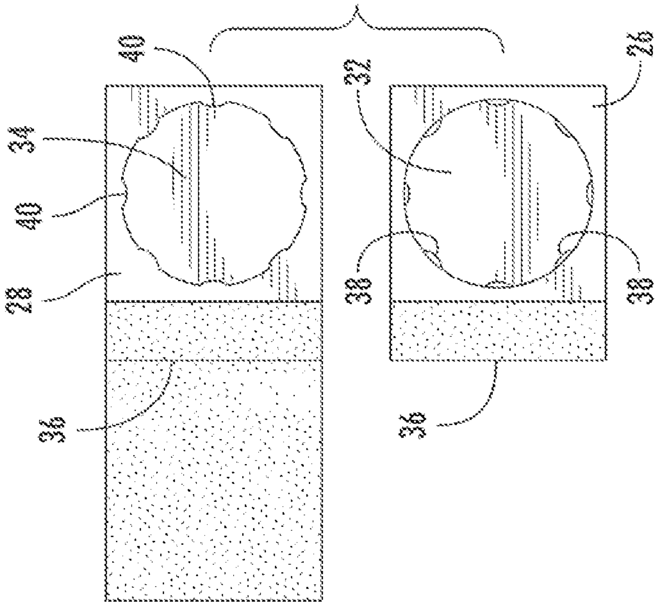
FIG. 12 shows a top view of the base holder and socket, showing the evenly distributed ribs, and also shows a bottom view of the extender and the male protrusion having a series of evenly distributed grooves, where the ribs and grooves are complementary to one another, so that the extender may be rotated along a vertical axis and inserted into the socket in a desired horizontal direction.
Figure 11:
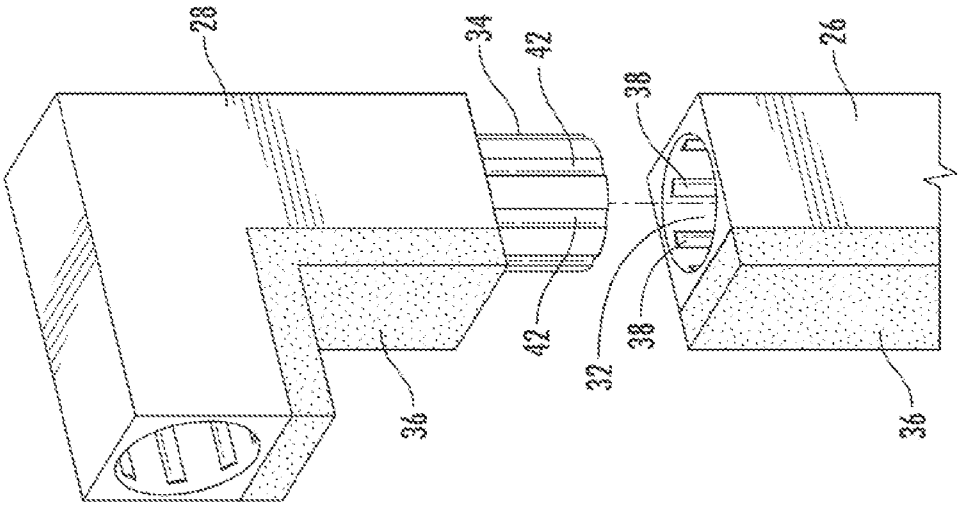
FIG. 11 is an exploded perspective view of a base holder having a different embodiment of a socket that includes a series of vertically oriented ribs distributed evenly about the inside surface of the socket, and further showing an extender element having a complementary male protrusion extending downwardly, wherein the outer surface of the male protrusion include a series of evenly distributed grooves, so that the extender may be rotated along a vertical axis and inserted into the socket in a desired horizontal direction.

Other types of attachment mechanisms may be used, as well, such as the star-shaped post and socket configuration shown in FIGS. 11 and 12, which allows an extender 28 to be oriented in any desired radial direction with respect to the socket 32. In this embodiment, the base holder socket 32 has a generally circular cross-section, and includes a series of vertically oriented ribs 38 that are evenly distributed about the inner surface of the socket 32. The complementary male protrusion 34 of the extender 28 in this embodiment has a generally circular cross-section, and includes a complementary set of grooves 40, that allow the extender 28 to be rotated about a vertical axis and inserted into the socket 32 of the base holder 26 in any desired radial direction.

Additionally, it is contemplated that other types of attachment mechanisms may be used for attaching extender elements 28 to the base holders 26, such as other types of snap-fit mechanisms, ball and socket mechanisms, and other means of attachment that allow greater flexibility and range of motion.

Figure 7:
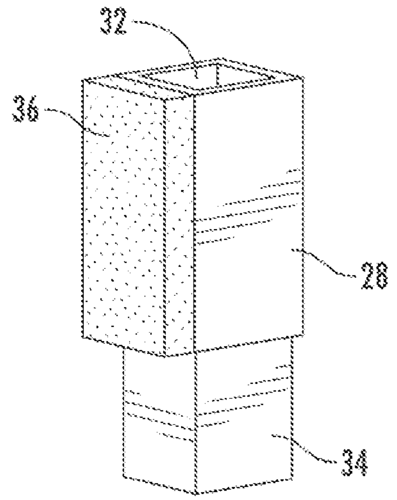
FIG. 7 is an elevated perspective view of an extender element, having a male protrusion on a bottom portion thereof for insertion into base holder sockets, such as those shown in FIG. 5, and further showing an optional socket at the top of the extender element, as well as padding on one vertical side thereof.
Figure 8:
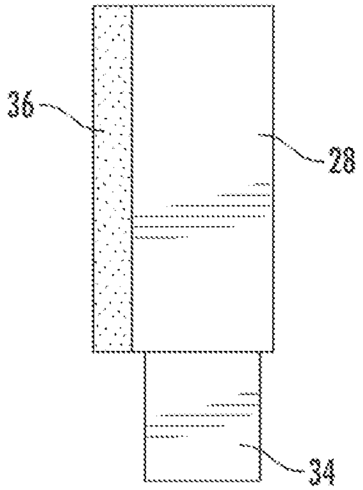
FIG. 8 is a side view of the extender element shown in FIG. 7.
Figure 9:
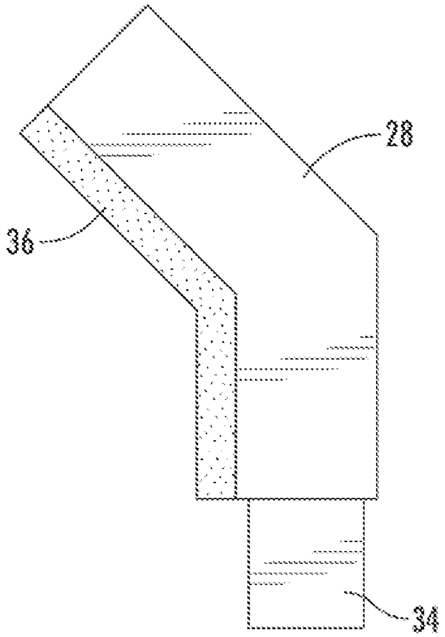
FIG. 9 is a side view of another embodiment of an extender element, which includes a post that extends upwardly and then extends angularly, further including padding on one vertical side and one angled side, and further includes a male protrusion on a bottom portion thereof for insertion into base holder sockets, such as those shown in FIG. 5.
Figure 10:
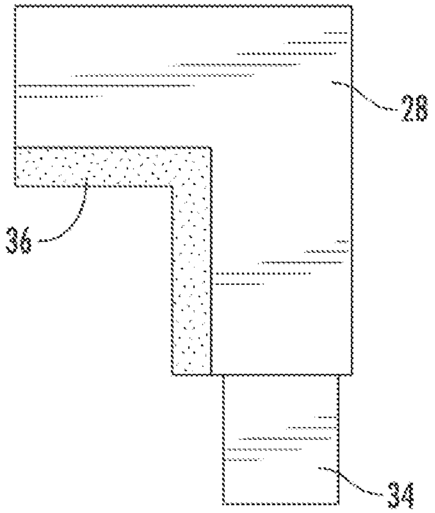
FIG. 10 is a side view of another embodiment of an extender element, which is formed in an L-shaped configuration, and includes padding along a vertical side and along a horizontally oriented side, and further includes a male protrusion on a bottom portion thereof for insertion into base holder sockets, such as those shown in FIG. 5.

The extenders 28 may be formed into any desired shape, as shown in FIGS. 7-10. For example, in one embodiment, extenders 28 are simply linear extensions that serve to increase the length of one side of the base holder 26 that the extender 28 is attached to, as shown in FIGS. 7-8 and 13. However, extenders 28 may also be formed into other shapes, such as an L-shape, as shown in FIG. 10. Extenders 28 may be formed into straight shapes, angled shapes, such as an extender that includes a 45° angle as shown in FIG. 9 (or any other desired angle), right angles, or may be curved, as desired.

Figure 15:
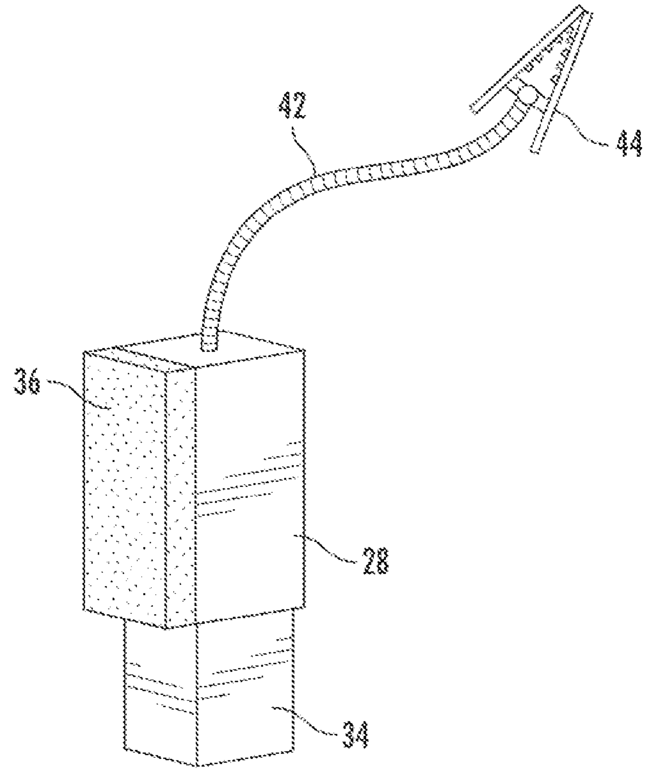
FIG. 15 is an elevated perspective view of one embodiment of an extender element, having a male protrusion on a bottom portion thereof that may be removably inserted into the socket of the base holder, padding on one side of thereof, and a gooseneck section extending from a top surface thereof, wherein a clamp is affixed to the distal end of the gooseneck section.
Figure 16:
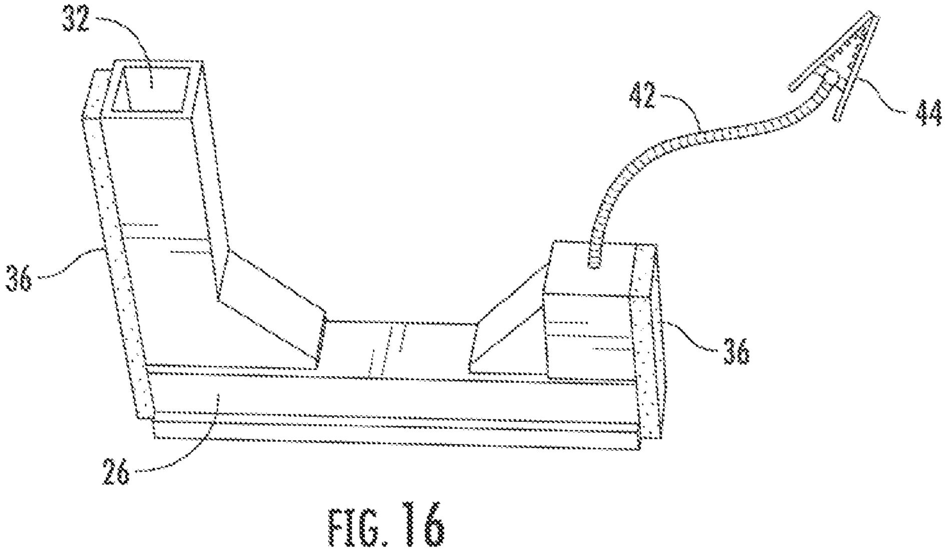
FIG. 16 is an elevated perspective view of one embodiment of a base holder that includes magnets in a bottom portion thereof, and further including vertical posts having sides having pad elements, wherein one vertical post includes a socket member for receiving an extender element, and the other vertical post includes a gooseneck section extending from a top surface thereof, wherein a clamp is affixed to the distal end of the gooseneck section.

Other types of extenders 28 may include clamps 44 (either fixed or positionally adjustable) that may be used to clamp 44 work pieces 14 in place. Such clamps 44 may be pinch clamps, screw clamps, vice mechanisms, or any other type of clamping mechanism. It is also contemplated that these types of clamping mechanisms may be formed directly on (or attached to) some embodiments of the base holders 26, as well. Additionally, base holders and extenders 28 may further include a flexible gooseneck section 42 having a clamp 44 attached to the distal end thereof, so that the gooseneck section 42 may be positioned in any suitable manner, in any direction and bent into any desired angle, so that the clamps 44 may be oriented in any desired position, orientation and angle. Examples of embodiments of holder elements having a gooseneck and clamp portion are illustrated in FIGS. 15-16

It is also contemplated that an extender 28 may include a male protrusion 34 on one end thereof, and a socket 32 on the other end thereof, as shown in FIGS. 7 and 11. This arrangement allows multiple extenders to be attached to a single base holder in series, as necessary.

Figure 1A:
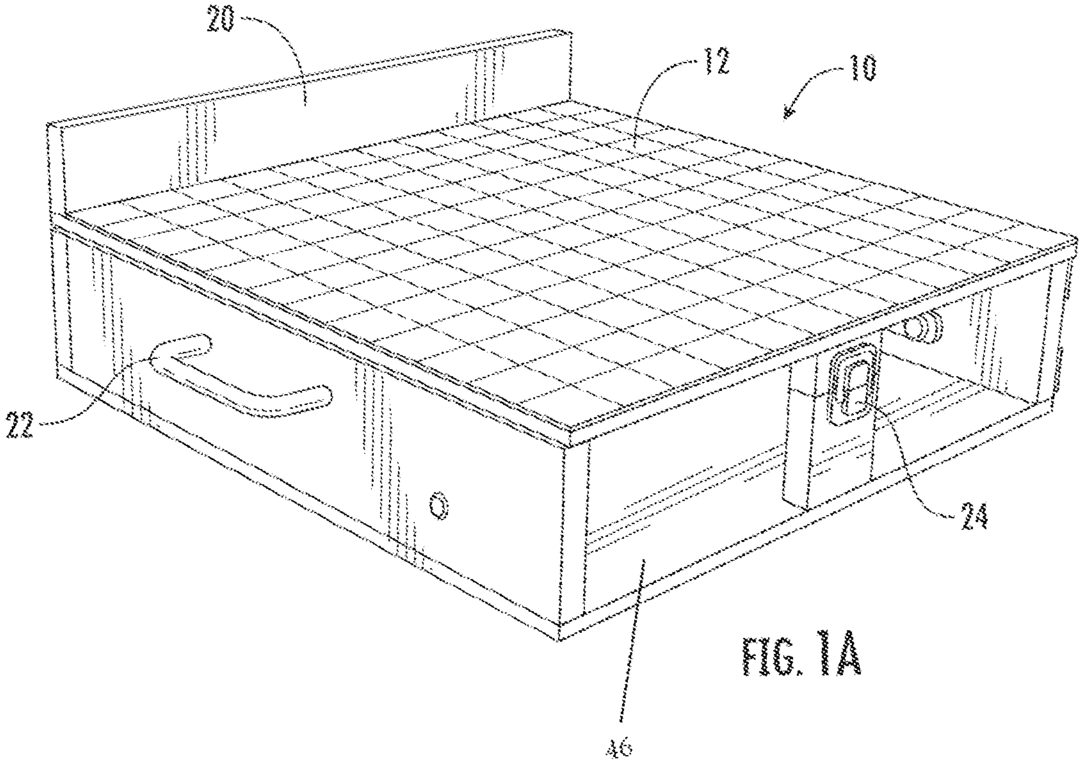
FIG. 1A is a perspective view of one embodiment of a work piece holder assembly, showing the main body member having a bottom, three closed sides, a fourth side that is open to provide access to the inner portion of the main body member, and a hinged work surface on an upper portion of the main body member, including a locking mechanism that serves to maintain the work surface in a closed position, and further including a lip member attached to the work surface along the hinged edge thereof and a handle member attached to one of the sides of the main body member.
Figure 1B:
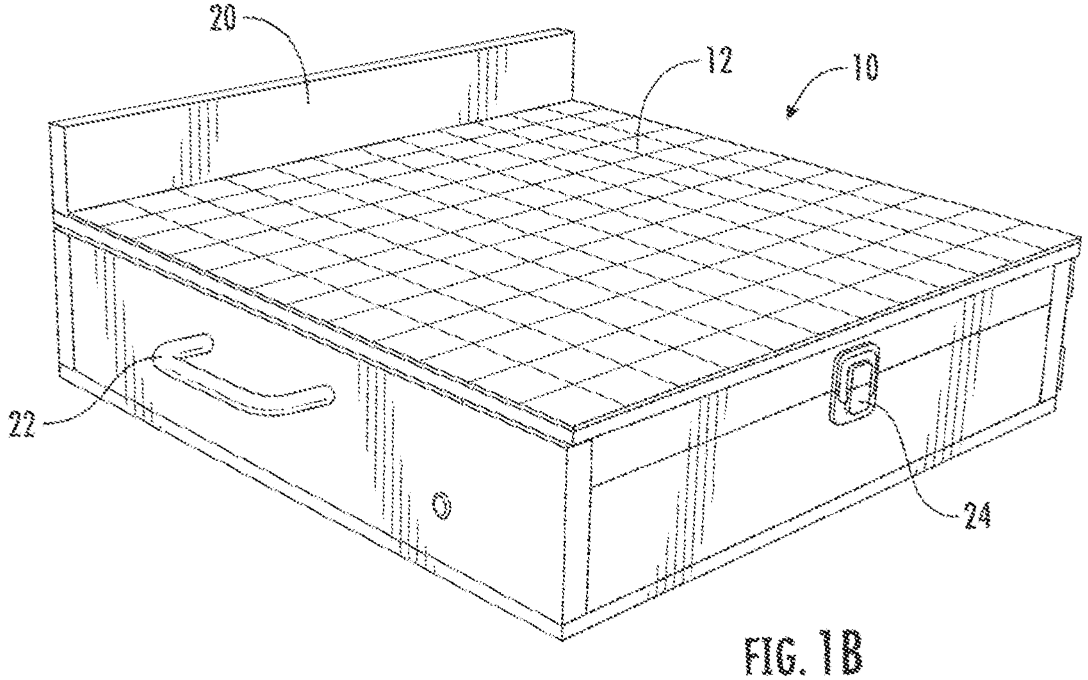
FIG. 1B is a perspective view of one embodiment of a work piece holder assembly, showing the main body member having a bottom, four closed sides, and a hinged work surface on an upper portion of the main body member, including a locking mechanism that serves to maintain the work surface in a closed position, and further including a lip member attached to the work surface along the hinged edge thereof and a handle member attached to one of the sides of the main body member.

The work piece holder assembly may be used to hold work pieces 14 having various shapes and sizes, including irregularly shaped work pieces, such as those shown in FIGS. 17-19. In use, a user simply arranges a plurality of the base holders 26 around a work piece 14, and attaches any extenders 28. The work surface 12 may be used in a horizontal (closed) position, as shown in FIG. 1, or it may be angled upwardly, as shown in FIGS. 2-3 and 17-19, as the elbow joints 18 (or other angular holding mechanisms) maintain the desired angular position of the work surface. Preferably the angular holding mechanisms, such as elbow joints 18 or other such mechanisms, may be temporarily fixed in any desired angle due to frictional engagement, infinitely adjustable mechanisms, adjustable snap-fit assemblies, or the like.

It is to be understood that this disclosure is not limited to single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The invention claimed is:

1. A work piece holder assembly comprising:

a main body member having a bottom member, sides attached to said bottom member and a magnetic work surface on an upper portion thereof, wherein said work surface is pivotally connected to one of said sides so that said work surface may pivot between an open and a closed position;

a series of base holders including magnets disposed therein for holding said base holders to said magnetic work surface, wherein said base holders include sides that are oriented in angles with respect to said work surface, said angles selected from the group consisting of acute angles, obtuse angles, and right angles;

wherein at least one said base holder includes a padding member attached to at least one outer surface thereof;

wherein said base holders are magnetically attachable to said magnetic work surface, and wherein said base holders may be stored within said main body member when not in use.

2. The work piece holder assembly set forth in claim 1, further including a locking mechanism for maintaining said work surface in a closed position.

3. The work piece holder assembly set forth in claim 1, wherein said base holder elements include a clamp member.

4. The work piece holder assembly set forth in claim 1, wherein said base holders include attachment mechanisms for receiving extender elements.

5. The work piece holder assembly set forth in claim 4, further including extender elements that are removably attachable to said base holders.

6. The work piece holder assembly set forth in claim 5, wherein said extender elements are formed into shapes selected from the group consisting of straight elements, angled elements, or curved elements.

7. The work piece holder assembly set forth in claim 4, wherein said extender elements include a clamp member.

8. The work piece holder assembly set forth in claim 4, wherein said extender elements include a pad member attached to at least one outer surface thereof.

9. The work piece holder assembly set forth in claim 1, further including a handle member attached to said main body member.

10. The wok piece holder assembly set forth in claim 1, wherein said bottom member includes a magnetic surface so that magnets are attracted thereto.

11. The work piece holder assembly set forth in claim 1, wherein said base holders include hook and loop material attached to at least one outer surface thereof.

12. The work piece holder assembly set forth in claim 4, wherein said extender elements include hook and loop material attached to at least one outer surface thereof.

13. The work piece holder assembly set forth in claim 1, wherein at least one of said base holders includes a hook member attached thereto.

14. The work piece holder assembly set forth in claim 4, wherein at least one extender element includes a hook member attached thereto.

15. The work piece holder assembly set forth in claim 1, wherein at least one of said base holders includes a gooseneck section attached thereto.

16. The work piece holder assembly set forth in claim 15, wherein said gooseneck section includes a clamp member on a distal end thereof.

17. The work piece holder assembly set forth in claim 4, wherein at least one said extender element includes a gooseneck section attached thereto.

18. The work piece holder assembly set forth in claim 17, wherein said gooseneck section includes a clamp member on a distal end thereof.

19. A work piece holder assembly comprising:

a main body member having a bottom member, sides attached to said bottom member and a magnetic work surface on an upper portion thereof, wherein said work surface is pivotally connected to one of said sides so that said work surface may pivot between an open and a closed position;

a series of base holders including magnets disposed therein for holding said base holders to said magnetic work surface, wherein said base holders include sides that are oriented in angles with respect to said work surface, said angles selected from the group consisting of acute angles, obtuse angles, and right angles;

wherein at least one of said base holders includes a hook member attached thereto; and wherein said base holders are magnetically attachable to said magnetic work surface, and wherein said base holders may be stored within said main body member when not in use.

20. The work piece holder assembly set forth in claim 19, further including a locking mechanism for maintaining said work surface in a closed position.

21. The work piece holder assembly set forth in claim 19, wherein said base holder elements include a clamp member.

22. The work piece holder assembly set forth in claim 19, wherein at least one said base holder includes a padding member attached to at least one outer surface thereof.

23. The work piece holder assembly set forth in claim 19, wherein said base holders include attachment mechanisms for receiving extender elements.

24. The work piece holder assembly set forth in claim 23, further including extender elements that are removably attachable to said base holders.

25. The work piece holder assembly set forth in claim 24, wherein said extender elements are formed into shapes selected from the group consisting of straight elements, angled elements, or curved elements.

26. The work piece holder assembly set forth in claim 24, wherein said extender elements include a clamp member.

27. The work piece holder assembly set forth in claim 24, wherein at least one of said extender elements includes a pad member attached to at least one outer surface thereof.

28. The work piece holder assembly set forth in claim 19, further including a handle member attached to said main body member.

29. The wok piece holder assembly set forth in claim 19, wherein said bottom member includes a magnetic surface so that magnets are attracted thereto.

30. The work piece holder assembly set forth in claim 19, wherein said base holders include hook and loop material attached to at least one outer surface thereof.

31. The work piece holder assembly set forth in claim 24, wherein said extender elements include hook and loop material attached to at least one outer surface thereof.

32. The work piece holder assembly set forth in claim 24, wherein at least one extender element includes a hook member attached thereto.

33. The work piece holder assembly set forth in claim 19, wherein at least one of said base holders includes a gooseneck section attached thereto.

34. The work piece holder assembly set forth in claim 33, wherein said gooseneck section includes a clamp member on a distal end thereof.

35. The work piece holder assembly set forth in claim 24, wherein at least one said extender element includes a gooseneck section attached thereto.

36. The work piece holder assembly set forth in claim 35, wherein said gooseneck section includes a clamp member on a distal end thereof.

37. A work piece holder assembly comprising:

a main body member having a bottom member, sides attached to said bottom member and a magnetic work surface on an upper portion thereof, wherein said work surface is pivotally connected to one of said sides so that said work surface may pivot between an open and a closed position;

a series of base holders including magnets disposed therein for holding said base holders to said magnetic work surface, wherein said base holders include sides that are oriented in angles with respect to said work surface, said angles selected from the group consisting of acute angles, obtuse angles, and right angles;

wherein at least one of said base holders includes a gooseneck section attached thereto; and wherein said base holders are magnetically attachable to said magnetic work surface, and wherein said base holders may be stored within said main body member when not in use.

38. The work piece holder assembly set forth in claim 37, further including a locking mechanism for maintaining said work surface in a closed position.

39. The work piece holder assembly set forth in claim 37, wherein said base holder elements include a clamp member.

40. The work piece holder assembly set forth in claim 37, wherein at least one said base holder includes a padding member attached to at least one outer surface thereof.

41. The work piece holder assembly set forth in claim 37, wherein said base holders include attachment mechanisms for receiving extender elements.

42. The work piece holder assembly set forth in claim 41, further including extender elements that are removably attachable to said base holders.

43. The work piece holder assembly set forth in claim 42, wherein said extender elements are formed into shapes selected from the group consisting of straight elements, angled elements, or curved elements.

44. The work piece holder assembly set forth in claim 42, wherein said extender elements include a clamp member.

45. The work piece holder assembly set forth in claim 42, wherein said extender elements include a pad member attached to at least one outer surface thereof.

46. The work piece holder assembly set forth in claim 37, further including a handle member attached to said main body member.

47. The wok piece holder assembly set forth in claim 37, wherein said bottom member includes a magnetic surface so that magnets are attracted thereto.

48. The work piece holder assembly set forth in claim 37, wherein said base holders include hook and loop material attached to at least one outer surface thereof.

49. The work piece holder assembly set forth in claim 42, wherein said extender elements include hook and loop material attached to at least one outer surface thereof.

50. The work piece holder assembly set forth in claim 37, wherein at least one of said base holders includes a hook member attached thereto.

51. The work piece holder assembly set forth in claim 42, wherein at least one extender element includes a hook member attached thereto.

52. The work piece holder assembly set forth in claim 37, wherein said gooseneck section includes a clamp member on a distal end thereof.

53. The work piece holder assembly set forth in claim 42, wherein at least one said extender element includes a gooseneck section attached thereto.

54. The work piece holder assembly set forth in claim 53, wherein said gooseneck section includes a clamp member on a distal end thereof.

* * * * *